(12) United States Patent
Li et al.

(10) Patent No.: US 8,496,796 B2
(45) Date of Patent: Jul. 30, 2013

(54) COMPOSITE FILMS COMPRISING CARBON NANOTUBES AND POLYMER

(75) Inventors: Xu Li, Singapore (SG); Chaobin He, Singapore (SG); Decheng Wu, Singapore (SG); Ye Liu, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 252 days.

(21) Appl. No.: 12/738,602

(22) PCT Filed: Oct. 17, 2007

(86) PCT No.: PCT/SG2007/000354
§ 371 (c)(1),
(2), (4) Date: Jun. 29, 2010

(87) PCT Pub. No.: WO2009/051561
PCT Pub. Date: Apr. 23, 2009

(65) Prior Publication Data
US 2010/0279095 A1    Nov. 4, 2010

(51) Int. Cl.
*C25D 13/02*    (2006.01)
(52) U.S. Cl.
USPC .......................................... 204/490; 204/491
(58) Field of Classification Search
USPC ........................... 204/490, 492, 491
See application file for complete search history.

(56) References Cited

U.S. PATENT DOCUMENTS

| | | | |
|---|---|---|---|
| 3,846,269 A | 11/1974 | Martello et al. | |
| 4,019,877 A | 4/1977 | Gass et al. | |
| 5,741,599 A | 4/1998 | Oie et al. | |
| 6,426,134 B1 | 7/2002 | Lavin et al. | |
| 6,495,258 B1 | 12/2002 | Chen et al. | |
| 6,934,600 B2 | 8/2005 | Jang et al. | |
| 6,936,653 B2 | 8/2005 | McElrath et al. | |
| 6,965,513 B2 | 11/2005 | Montgomery et al. | |
| 6,986,853 B2 | 1/2006 | Glatkowski et al. | |
| 7,026,432 B2 | 4/2006 | Charati et al. | |

(Continued)

FOREIGN PATENT DOCUMENTS

| EP | 0 770 638 A1 | 5/1997 |
|---|---|---|
| EP | 1 123 954 A1 | 8/2001 |

(Continued)

OTHER PUBLICATIONS

Jin et al.; "Triode-type field emission array using carbon nanotubes and a conducting polymer composite prepared by electrochemical polymerization"; *J. Appl. Phys.*; 92(2): 1065-1068 (2002).

(Continued)

*Primary Examiner* — Kishor Mayekar (74) *Attorney, Agent, or Firm* — Kilpatrick Townsend & Stockton LLP (57) ABSTRACT

A process for forming a composite film on a substrate comprises providing a suspension comprising an ionised polymer and functionalised carbon nanotubes in a solvent, at least partially immersing the substrate and a counterelectrode in the suspension, and applying a voltage between the substrate and the counterelectrode so as to form the composite film on the substrate. Electrical charges on the polymer and on the nanotubes have the same sign and the voltage is applied such that the charge on the substrate has the opposite sign to the charge on the polymer and the nanotubes.

13 Claims, 3 Drawing Sheets

CNTs-Polyamic acid    Close-packing    Coherent composite

U.S. PATENT DOCUMENTS

| | | | |
|---|---|---|---|
| 7,473,153 | B2 | 1/2009 | Kang et al. |
| 7,553,341 | B2 * | 6/2009 | Pan et al. .................... 29/25.03 |
| 7,588,699 | B2 | 9/2009 | Connell et al. |
| 2003/0158323 | A1 | 8/2003 | Connell et al. |
| 2005/0272855 | A1 | 12/2005 | Renken |
| 2006/0001013 | A1 | 1/2006 | Dupire et al. |
| 2006/0063464 | A1 | 3/2006 | Kang et al. |
| 2006/0293434 | A1 | 12/2006 | Yodh et al. |
| 2008/0131658 | A1 * | 6/2008 | Wakharkar et al. .......... 428/137 |

FOREIGN PATENT DOCUMENTS

| | | |
|---|---|---|
| EP | 1 439 248 A1 | 7/2004 |
| JP | 2001-172582 A | 6/2001 |
| JP | 2003-023181 A | 1/2003 |
| JP | 2006-063436 A | 3/2006 |
| JP | 2007-103375 | 4/2007 |
| WO | WO 02/095098 A1 | 11/2002 |
| WO | WO 2004/046031 A1 | 6/2004 |
| WO | WO 2004-097853 A1 | 11/2004 |
| WO | WO 2007-011313 A1 | 1/2007 |
| WO | WO 2007/029934 A1 | 3/2007 |
| WO | WO 2007-129983 A1 | 11/2007 |

OTHER PUBLICATIONS

Abe, Y., et al., "Highly Efficient Direct Current Electrodeposition of Single-Walled Carbon Nanotubes in Anhydrous Solvents," Advanced Materials 2005, vol. 17, pp. 2192-2194, Copyright 2005 Wiley-VCH Verlag GmbH & Co. KGaA, Weinheim.

Besra, L., et al., "A Review on Fundamentals and Applications of Electrophoretic Deposition (EPD)," Progress in Materials Science 2007, vol. 52, pp. 1-61, Copyright 2006 Elsevier Ltd.

Boccaccini, A. R., et al., "Electrophoretic Deposition of Carbon Nanotubes," Carbon 2006, vol. 44, Issue 15, pp. 3149-3160, Available online Jul. 26, 2006, Copyright 2006 Elsevier Ltd.

Chambers, S. A., et al., "Oxidation of Cu in Contact with Preimidized Polyimide," Journal of Vacuum Science & Technology A, vol. 8, Issue 2, Mar./Apr. 1990, pp. 875-884, Copyright 1990 American Vacuum Society.

Gao, B., et al., "Fabrication and Electron Field Emission Properties of Carbon Nanotube Films by Electrophoretic Deposition," Advanced Materials 2001, vol. 13, No. 23, Dec. 3, 2001, pp. 1770-1773, Copyright 2001, Wiley-VCH Verlag GmbH, D-69469 Weinheim.

Grunlan, J. C., et al., "Water-Based Single-Walled-Nanotube-Filled Polymer Composite with an Exceptionally Low Percolation Threshold," Advanced Materials 2004, vol. 16, No. 2, Jan. 16, 2004, pp. 150-153, Copyright 2004, Wiley-VCH Verlag GmbH & Co. KGaA, Weinheim.

Jang, J., et al., "Interfacial Study of Polyimide/Copper System Using Silane-Modified Polyvinylimidazoles as Adhesion Promoters," Polymer 2001, vol. 42, pp. 2871-2876, Copyright 2001 Elsevier Science Ltd.

Jung, S. M., et al., "Clean Carbon Nanotube Field Emitters Aligned Horizontally," Nano Letters 2006, vol. 6, No. 7, pp. 1569-1573, Published on Web Jun. 7, 2006, Copyright 2006 American Chemical Society.

Kim, Y. J., et al., "Electrical Conductivity of Chemically Modified Multiwalled Carbon Nanotube/Epoxy Composites," Carbon 2005, vol. 43, pp. 23-30, Available online Oct. 18, 2004, Copyright 2004 Elsevier Ltd.

Li, N., et al., "Electromagnetic Interference (EMI) Shielding of Single-Walled Carbon Nanotube Epoxy Composites," Nano Letters 2006, vol. 6, No. 6, pp. 1141-1145, Published on Web May 5, 2006, Copyright 2006 American Chemical Society.

Li, Z., et al., "Microstructure of Carbon Nanotubes/PET Conductive Composites Fibers and their Properties," Composites Science and Technology 2006, vol. 66, pp. 1022-1029, Available online Sep. 26, 2005, Copyright 2005 Elsevier Ltd.

Moisala, A., et al., "Thermal and Electrical Conductivity of Single- and Multi-Walled Carbon Nanotube-Epoxy Composites," Composites Science and Technology 2006, vol. 66, pp. 1285-1288, Available online Dec. 15, 2005, Copyright 2005 Elsevier Ltd.

Regev, O., et al., "Preparation of Conductive Nanotube-Polymer Composites Using Latex Technology," Advanced Materials 2004, vol. 16, No. 3, Feb. 3, 2004, pp. 248-251, Copyright 2004 Wiley-VCH Verlag GmbH & Co. KGaA, Weinheim.

Sandler, J.K.W., et al., "Ultra-Low Electrical Percolation Threshold in Carbon-Nanotube-Epoxy Composites," Polymer 2003, vol. 44, pp. 5893-5899, Copyright 2003 Elsevier Ltd.

* cited by examiner

CNTs-Polyamic acid → Close-packing → Coherent composite

COMPOSITE FILMS COMPRISING CARBON NANOTUBES AND POLYMER

CROSS-REFERENCE TO RELATED APPLICATIONS

The present application is the U.S. National Stage entry under §371 of International Application No. PCT/SG2007/000354, filed Oct. 17, 2007, herein incorporated by reference.

TECHNICAL FIELD

The present invention relates to composite films and to processes for making them.

BACKGROUND OF THE INVENTION

Carbon nanotubes (CNTs) are fullerene-related structures of graphite cylinders and were first synthesized by Iijima (Iijima S, Helical microtubes of graphitic carbon, *Nature* 1991, 354, 56). Single walled nanotubes (SWNTs) consist of single layers of graphite lattice rolled into cylinders, whereas multiwalled nanotubes (MWNTs) consist of sets of concentric cylindrical shells, each of which resembles a SWNT. Such unique structure provides the CNTs with exceptional electrical and thermal conductivity, high strength and stiffness and enormous aspect ratio. These properties enable the development of electrically conductive polymeric composites with very low CNT loading and can provide improved mechanical performance to a polymeric matrix for applications ranging from electronic to aerospace and automotive industry. Potential applications include conductive structure materials for aerospace or automotive industry, electromagnetic interface (EMI) shielding materials, dissipative materials and thermal management materials for the microelectronic industry and potential transparent field emission materials for display and other electronic applications.

According to percolation theory, a three dimensional CNT conductive network in polymer matrix is needed to provide a conductive path. The percolation threshold is characterized by a sharp increase in conductivity coinciding with the formation of a three dimensional conductive network. Thus, a key factor to achieve reasonable conductivity is the proper dispersion of a CNT filler in a polymeric matrix. In past years several techniques have been developed to efficiently disperse CNTs in a polymeric matrix. The commonest method is direct mixing of CNTs and polymer through melt blending or shear-intensive mechanical stirring (Moisala A, Li Q, Kinloch I A, Windle A H, Thermal and electrical conductivity of single and multi walled carbon nanotube epoxy composites, *Composites science and technology*, 2006, 66, 1285; Li Z F, Luo G H, Wei F and Huang Y, Microstructure of carbon nanotubes/PET conductive composites fibers and their properties, *Composites science and technology*, 2006, 66, 1002; Sandler J K W, Kirk J E, Kinloch I A, Shaffer, M S P and Windle A H, Ultra low electrical percolation threshold in carbon nanotube epoxy composites, *Polymer*, 2003, 44, 5893; Lavin J G and Samuelson H V, Single wall carbon nanotube polymer composites, U.S. Pat. No. 6,426,134). However this method is generally not very effective at dispersing CNTs in polymers and is limited to thermoplastics or low viscosity polymers.

In another dispersion method, a solvent was employed to lower the viscosity of polymer and facilitate the dispersion of CNTs. With this method, CNTs are first exfoliated into an organic solvent under high-power ultrasonication. Then the CNT suspension is mixed with polymer, and the organic solvent is allowed to evaporate (Kim Y J, Shin T S, Choi H D, Kwon J H, Chung Y C and Yoon H G, Electrical conductivity of chemically modified multiwalled carbon nanotube/epoxy composites, *Carbon*, 2005, 43, 23; Li N, Huang Y, Du F, He X B and Eklund P C, Electromagnetic interference shielding of single walled carbon nanotube epoxy composites, *Nano Lett*, 2006, 6, 1141; Connell J W, Smith J G, Harrison J S, Park C, Watson K A, Ounaies Z, Electrically conductive, optically transparent polymer/carbon nanotube composites and process for preparation thereof, U.S. Pat. 2003/0158323). Compared to the earlier described method, the dispersion of CNTs in the polymer using this method is better. However high-power ultrasonication for a long period of time generally shortens the nanotube length and destroys its integrity, which is detrimental to the conductivity of the resulting composite. Also, during slow solvent evaporation, nanotubes tend to agglomerate, leading to inhomogeneous distribution in the polymer matrix. Another problem with the solution blending method is the use of toxic and flammable solvents.

Grunlan et al describe an approach to incorporating CNTs into a polymeric matrix with relatively low percolation threshold based on the use of latex technology (Grunlan J C, Mehrabi A R, Bannon M V, Bahr J L, Water based single walled nanotube filled polymer composite with an exceptionally low percolation threshold, *Adv Mater* 2004, 16, 150). Initially, CNTs and polymer particles were uniformly suspended in a solvent. Once most of the solvent had evaporated, the polymer particles assumed a close-packed configuration with CNTs occupying interstitial space. Finally, the polymer particles were coalescenced together to form a coherent film locking the CNTs within a segregated three dimensional network. In this processing method solid polymer particles created excluded volume to reduce the free volume available for the CNTs to form a conductive network. As a result, the percolation threshold was significantly reduced.

The interfacial interaction between CNTs and a polymeric matrix will affect the compatibility of CNTs with the matrix, and hence their dispersion in the matrix. Thus, both modification of the CNTs by functionalization of their walls and modification of the polymer matrix have been employed to promote the dispersion of CNTs.

While the prior dispersion techniques may be generally satisfactory for their respective systems, these techniques are quite limited in their ability to fabricate conductive thin films with controlled thickness, especially on irregular-shaped substrates.

Electrophoretic deposition (EPD) is a widely used industrial colloidal process to produce thin films on conductive substrates. In EPD, charged particles suspended in a liquid medium are attracted and deposited onto an oppositely charged conductive electrode in a DC electric field (Berra L and Liu M L, *Progress in materials science*, 2007, 52, 1). EPD has advantages of short film formation time, simple apparatus, continuous fabrication, good homogeneity and packing density and suitability for mass production as in electric coating industry. Most importantly, it can be used to fabricate thin film onto variously-shaped surfaces with controlled thickness and morphology. Patterned deposition can also be achieved by using masked electrode. EPD has been used to produce pre-fabricated CNTs (Boccaccini A R, Cho J, Roether J A, Thomas B J C, Minay E J and Shaffer M S P, Electrophoretic deposition of carbon nanotubes, *Carbon*, 2006, 44, 3149), and such fabricated CNTs films show good electron field emission stability under both continuous and pulsed operations (Gao B, Yue G Z, Qiu Q, Cheng Y, Shimoda H, Fleming L and Zhou O, Fabrication and electron field emission properties of carbon nanotube films by electrophoretic deposition, *Adv Mater* 2001, 13, 1770).

Polyimides (PI) are excellent in heat resistance, chemical resistance and mechanical properties. They are widely used in aerospace and automotive industry and also play important role as dielectric layers in a variety of microelectronic devices. In microelectronics industry, PI films are commonly produced by film casting of a non-aqueous polyamic acid precursor solution followed by heat curing. The various casting methods include air spraying, roll coating, brush coating and dip coating. However, irregular-shaped objects cannot be easily provided uniform coating films by these methods.

To solve this problem, EPD has been employed, and has shown some additional advantages such as small loss in coating materials and uniform thin film with controlled thickness. A continuous coating of PI onto electrical conductor has been disclosed in U.S. Pat. No. 3,846,269 (Marcello N E, Creek T and Phillips D C, Method for continuous coating of polyimide by electrodeposition). In this method a coated electrical conductor is made by continuously passing a positively charged electrical conductor near a negatively charged electrode in a bath of a conducting non-aqueous polyamic acid suspension. A photosensitive polyimide having oxycarbonyl groups in side chains has been developed and employed to fabricate a patterned PI film through EPD followed by photolithography (Hiroshi I and Shunichi M, Composition for polyimide electrodeposition and method of forming patterned polyimide film with the same, EP 1 123 954).

In the microelectronics industry, the adhesion strength between PI and metallic substrate is a crucial factor influencing the performance of electronic devices. PI is known to adhere poorly to metals, especially to copper, and is easily delaminated from a copper substrate. It was found that acid groups of polyamic acid can react with copper to produce copper ions. These copper ions can diffuse into the PI layer to accelerate the oxidation of PI during heat curing at elevated temperature (Chamber S A, Loebs V A and Chakravorty K K, Oxidation of Cu in contact with preimidized polyimide *J Vac Sci Technol* 1990, A8, 875). To prevent the diffusion of copper ion and maintain the adhesion strength of the PI/copper interface, a barrier film such as Cr, Ni or Ta is always inserted between PI and copper (Ghosh M K and Mittal K L, *Polyimides: fundamentals and applications*, New York: Marcel Dekker, 1996). However, this method is not simple or cost effective. Polyvinylimidazole (PVI) and its silane derivatives have been developed to prevent corrosion of PI layer at high temperature (Jang J and Earmme T, Interfacial study of polyimide/copper system using silane modified polyvinylimidazoles as adhesion promoters, *Polymer*, 2001, 42, 2871). These materials suppress the corrosion of copper and the diffusion of copper ion into PI through complex formation with copper (Xue G, Shi, G, Ding J, Chang W, Chen R, Complex-induced coupling effect-adhesion of some polymers to copper metal promoted by benzimidazole, *J Adhesion Sci Technol*, 1990, 4, 723). On the other hand, silanes are an effective adhesion promoter of PI/inorganic interface (Linde H G and Gleason R T, Thermal stability of the silica-aminopropylsilane-polyimide interface, *J Polym Sci Chem Ed* 1984, 22, 3043). However, the application of PVI and its silane derivatives requires casting these primers onto the copper substrate before application of the PI, which makes the processing more complicated.

Thus, there is a need for an efficient method to produce CNT-filled composite thin films through EPD with tunable thickness and electrical conductivity. There is also a need for a method to increase the adhesion strength of a polymeric thin film to a metallic substrate through incorporating CNTs into the film.

OBJECT OF THE INVENTION

It is an object of the present invention to substantially overcome or at least ameliorate one or more of the above disadvantages. It is a further object to at least partially satisfy at least one of the above needs.

SUMMARY OF THE INVENTION

In a first aspect of the invention there is provided a process for forming a composite film on a substrate comprising:
(i) providing a suspension comprising an ionised polymer and functionalised carbon nanotubes in a solvent;
(ii) at least partially immersing the substrate and a counterelectrode in the suspension; and
(iii) applying a voltage between the substrate and the counterelectrode so as to form the composite film on the substrate;
wherein electrical charges on the polymer and on the nanotubes have the same sign and the voltage is applied such that the charge on the substrate has the opposite sign to the charge on the polymer and the nanotubes.

The following options may be used in conjunction with the first aspect, either individually or in any appropriate combination.

The voltage may be a DC voltage. The voltage may be applied so as to cause the substrate and the counterelectrode to have opposite electrical charges. The voltage may be applied so as to cause a current to flow between the substrate and the counterelectrode. The voltage may be applied so as to cause a DC current to flow between the substrate and the counterelectrode.

The functionalised nanotubes and the polymer may both be negatively charged and the voltage may be applied such that the charge on the substrate is positive (i.e. the substrate may function as an anode). Alternatively the nanotubes and the polymer may both be positively charged and the voltage may be applied such that the charge on the substrate is negative (i.e. the substrate may function as a cathode).

The functionalised nanotubes may comprise multiwalled nanotubes (MWNTs). They may comprise single walled nanotubes (SWNTs). They may comprise a mixture of MWNTs and SWNTs. They may be chemically modified nanotubes. They may be nanotubes in which the surface of the nanotubes is chemically modified. They may be MWNTs in which the surface of the MWNTs is chemically modified. They may be surface functionalised carbon nanotubes. They may be electrically charged carbon nanotubes. They may be oxidised carbon nanotubes. They may be functionalised carbon nanotubes in which the surface of the walls of the nanotubes has been oxidised. They may be oxidised MWNTs. They may be functionalised MWNTs in which the surface walls of the MWNTs are oxidised.

The functionalised nanotubes may comprise functional groups on the surface thereof. The functional groups may be electrically charged. They may be at least partially ionised. They may be negatively charged. They may be anionic. The functionalised nanotubes may have carboxylate groups on the surface thereof. They may have some other anionic group on the surface thereof or coupled to the surface thereof, e.g. phosphate, sulfate, sulfonate, carbonate, thiocarbonate, dithiocarbonate, thiocarboxylate or dithiocarboxylate. They may have more than one type of anionic group on the surface or coupled to the surface. When mention is made of groups on the surface of the nanotubes, the groups may be directly attached to the surface, or may be coupled thereto via a linker group.

The polymer may comprise a polyamic acid. In this case the process may additionally comprise the step of heating the composite film so as to convert the polyamic acid into a polyimide. The polymer may be a polymer having acidic groups and/or anionic groups formed from acidic groups. The groups may be carboxylate, phosphate, sulfate, sulfonate, carbonate or a mixture of any two or more of these.

The substrate may be an electrically conductive substrate. It may be an electrically non-conductive substrate. It may comprise a non-conductive coating on a conductive base. It may comprise a conductive coating on a non-conductive base. It may comprise a polymer-coated metal. The substrate may be metallic. It may comprise copper. It may comprise chromium. It may comprise a chromium coated silicon wafer. The substrate should be capable of becoming electrically charged when connected to a DC voltage source.

The solvent may comprise a polar organic solvent. It may comprise a protic solvent. It may comprise an aprotic solvent. It may comprise a mixture of solvents, at least one of which is a polar organic solvent.

The ratio of nanotubes to polymer in the suspension may be such that the composite film is electrically conductive. The ratio of nanotubes to polymer in the suspension may be such that the composite film adheres to the substrate. The ratio may be between about 0.5% and about 5%, or between about 0.5% and about 2%, or about 0.5% to 1.5% on a w/w basis.

Step (i) may comprise combining a suspension of the nanotubes with a colloidal suspension of the polymer. The process may comprise the step of preparing the colloidal suspension of the ionised polymer by combining a solution of an acid form of the polymer with a neutralising agent, said neutralising agent being sufficiently basic to at least partially deprotonate the acid form of the polymer to form the ionised polymer. The neutralising agent may be in solution in a liquid. Said liquid may be a poor solvent for the polymer.

Step (i) may comprise preparing a suspension of functionalised nanotubes. It may comprise preparing a suspension of charged nanotubes, e.g. negatively charged nanotubes. This may comprise functionalisation of the nanotubes. It may comprise surface functionalisation of the nanotubes. It may comprise oxidation of carbon nanotubes. It may comprise surface oxidation of carbon nanotubes. The oxidation may be an acid oxidation. It may use an oxidising acid such as nitric acid. It may use a peroxide. It may use a peroxyacid. It may use oxygen.

The voltage may be applied for a sufficient time to form the composite film having a predetermined thickness. The process may comprise the step of selecting a time for application of the voltage so as to obtain a desired thickness of the composite film.

The ratio of carbon nanotubes to polymer may be determined so as to achieve a predetermined electrical conductivity of the film. The process may comprise the step of selecting a ratio of carbon nanotubes to polymer so as to obtain a desired electrical conductivity of the film.

The process may be such that the composite film has the functionalised carbon nanotubes substantially homogeneously distributed through the polymer.

In an embodiment there is provided a process for forming a composite film on a substrate comprising:
(i) providing a suspension comprising an ionised polymer and functionalised carbon nanotubes in a solvent;
(ii) at least partially immersing the substrate and a counterelectrode in the suspension; and
(iii) applying a DC voltage between the substrate and the counterelectrode so as to form the composite film on the substrate;
wherein electrical charges on the polymer and on the nanotubes have the same sign and the voltage is applied such that the charge on the substrate has the opposite sign to the charge on the polymer and the nanotubes.

In another embodiment there is provided a process for forming a composite film on a substrate comprising:
(i) providing a suspension comprising an ionised polymer and functionalised carbon nanotubes in a solvent;
(ii) at least partially immersing the substrate and a counterelectrode in the suspension; and
(iii) applying a voltage between the substrate and the counterelectrode so as to cause a current to flow between the substrate and the counterelectrode so as to form the composite film on the substrate;
wherein electrical charges on the polymer and on the nanotubes have the same sign and the voltage is applied such that the charge on the substrate has the opposite sign to the charge on the polymer and the nanotubes.

In another embodiment there is provided a process for forming a composite film on a substrate comprising:
(i) providing a suspension comprising a negatively charged polymer and negatively charged functionalised carbon nanotubes in a solvent;
(ii) at least partially immersing the substrate and a counterelectrode in the suspension; and
(iii) applying a voltage between the substrate and the counterelectrode such that the charge on the substrate is positive so as to form the composite film on the substrate.

In another embodiment there is provided a process for forming a composite film on a substrate comprising:
(i) providing a suspension comprising a negatively charged polymer and negatively charged functionalised carbon nanotubes in a solvent;
(ii) at least partially immersing the substrate and a counterelectrode in the suspension; and
(iii) applying a DC voltage between the substrate and the counterelectrode such that the charge on the substrate is positive so as to form the composite film on the substrate.

In another embodiment there is provided a process for forming a composite film on a substrate comprising:
(i) preparing negatively charged functionalised carbon nanotubes by oxidation of carbon nanotubes;
(ii) preparing a suspension comprising a negatively charged polymer and the negatively charged functionalised carbon nanotubes in a solvent;
(iii) at least partially immersing the substrate and a counterelectrode in the suspension; and
(iv) applying a voltage between the substrate and the counterelectrode such that the charge on the substrate is positive so as to form the composite film on the substrate.

In another embodiment there is provided a process for forming a composite film on a substrate comprising:
(i) preparing negatively charged functionalised carbon nanotubes by acid oxidation of carbon nanotubes;
(ii) preparing a suspension comprising a negatively charged polymer and the negatively charged carbon nanotubes in a solvent;
(iii) at least partially immersing the substrate and a counterelectrode in the suspension; and
(iv) applying a DC voltage between the substrate and the counterelectrode so as to cause a DC current to flow between the substrate and the counterelectrode such that the charge on the substrate is positive, so as to form the composite film on the substrate.

In another embodiment there is provided a process for forming a composite film on a substrate comprising:

(i) preparing a suspension comprising an at least partially ionised polyamic acid and negatively charged functionalised carbon nanotubes in a solvent;

(ii) at least partially immersing the substrate and a counterelectrode in the suspension;

(iii) applying a DC voltage between the substrate and the counterelectrode such that the charge on the substrate is positive, so as to form a film on the substrate, said film comprising the polyamic acid having the fuctionalised carbon nanotubes substantially homogeneously distributed therethrough; and (iv) heating the film for sufficient time at a sufficient temperature to convert the polyamic acid to a polyimide.

The invention also provides composite film made by the process of the first aspect.

In a second aspect of the invention there is provided a composite film comprising functionalised carbon nanotubes dispersed in a polymer, said nanotubes being substantially homogeneously distributed through the polymer.

In a third aspect of the invention there is provided a composite film comprising carbon nanotubes dispersed in a polymer, wherein the carbon nanotubes comprise functional groups on the surface thereof and the polymer comprises functional groups.

The nanotubes may be substantially homogeneously distributed through the polymer. The functional groups on the surface of the carbon nanotubes may be, or may be derived from, anionic groups. The functional groups on the polymer may be, or may be derived from, anionic groups.

The following options may be used in conjunction with the second or the third aspect, either individually or in any appropriate combination.

The nanotubes may have oxygen-containing functional groups on the surface thereof. They may have carboxylate groups, or groups derived therefrom, on the surface thereof.

The film may be electrically conductive. It may have an electrical conductivity of at least about $1 \times 10^{-3}$ $Sm^{-1}$ and a carbon nanotube content of about 0.65 wt %, or about 0.8 wt %, or about 1 wt % or about 1.2 wt % relative to polymer.

The carbon nanotubes may comprise MWNTs.

The polymer may be a polyamic acid or a polyimide.

The carbon nanotubes may be covalently bonded to the polymer.

The film may have a thickness of less than about 100 microns, or in may have a thickness of less than about 50 microns, or it may have a thickness of about 5 to about 50 microns, or it may have a thickness of about 5 to abut 100 microns. It may have uniform thickness.

The film may be disposed on an irregular substrate. It may be disposed on a substrate having an irregular shape. It may be disposed on a substrate having a non-smooth surface, or having a rough surface, or having an irregular surface.

The film may have a tunable thickness.

In an embodiment there is provided an electrically conductive composite film comprising functionalised MWNTs dispersed in a polyimide, said MWNTs being substantially homogeneously distributed through the polymer.

In another embodiment there is provided an electrically conductive composite film comprising functionalised MWNTs dispersed in a polyimide, said MWNTs being substantially homogeneously distributed through the polymer, wherein the MWNTs are covalently bonded to the polymer.

The film may be disposed on a substrate, e.g. an electrically conductive substrate. The substrate with the composite film disposed thereon may be an electrode. The electrode may be an anode.

The film may be made by the process of the first aspect of the invention.

DETAILED DESCRIPTION OF THE INVENTION

The present invention encompasses carbon nanotube (CNT)/polymer composite thin films and their fabrication through electrophoretic deposition (EPD). These processes enhance the adhesive strength of polymeric thin films onto metallic substrates, and thereby broaden the range of their potential applications.

In one embodiment, an EPD suspension comprising negatively charged functionalised CNTs and at least partially ionised polyamic acid (PAA) colloids in methanol/NMP is subjected to a DC electrical field, thereby causing both CNTs and PAA colloids to migrate towards the anode. The deposition rate may be dependent on the suspension concentration, DC current and conductivity of the electrode. After imidization of PAA through heating curing, a CNT/polyimide (PI) composite film is produced with tunable thickness and conductivity.

The present invention also encompasses enhancing adhesion strength of polymer onto a metallic substrate through incorporating CNTs. In one embodiment, the adhesion strength of PI onto copper substrate is enhanced. While crack or delamination of PI film coated on copper substrate is generally observed if CNTs are not present in the film, the CNT/PI composite film attaches to copper substrate quite stably.

The present invention provides a process for forming a composite film on a substrate.

The first step of the process is to provide a suspension comprising an ionised polymer and functionalised carbon nanotubes in a solvent. The ionised polymer will have an electrical charge associated with it. It may therefore be regarded as an electrically charged polymer. The ionised polymer may be completely ionised. It may be partially ionised. In some embodiments it will be a cationic polymer. In other embodiments it will be an anionic polymer. It may have cationic groups on the surface thereof. It may have anionic groups on the surface thereof. Where mention is made of an electrical charge on the polymer and/or on the nanotubes, this refers to a net electrical charge thereon. The functionalised carbon nanotubes may have anionic functional groups on the surface thereof or may have cationic functional groups on the surface thereof. The suspension may be a stable suspension. It may be stable for at least about 1 day, or at least about 2, 3, 4, 5 or 6 days, or at least about 1, 1.5, 2, 2.5, 3, 3.5, 4, 4.5 or 5 weeks at room temperature, or may be stable for a period of about 1 day, or about 2, 3, 4, 5 or 6 days, or about 1, 1.5, 2, 2.5, 3, 3.5, 4, 4.5 or 5 weeks at room temperature. In this context, "stable" refers to a suspension that shows no visible signs of separation over the stated period without stirring. The electrical charges on the polymer and the carbon nanotubes have the same sign (i.e. either both positive or both negative). Suitable positively charged groups on either the carbon nanotubes or on the polymer, or on both, include trialkylammonium groups (where the alkyl group is commonly C1 to C6, e.g. methyl, ethyl, propyl, isopropyl etc., and may be a mixture of alkyl groups). Suitable negatively charged groups on either the carbon nanotubes or on the polymer, or on both, include, independently, carboxylate, phosphate, sulfate, sulfonate, carbonate or a mixture thereof. These groups may be attached directly to the polymer or nanotubes, or may be attached via a linker, for example an alkyl or an aryl group. Negative charges on either the nanotubes or on the polymer or on both may be generated by at, least partial deprotonation of the corresponding acid form of the charged group (e.g. of a carboxylic acid, sulfonic acid etc.). This may be achieved by reaction with a suitable base, e.g. a trialkylamine (such as triethylamine). The degree of deprotonation or ionisation (independently for the nanotubes and for the polymer) may be between about 5 and about 100%, or about 5 to 90, 5 to 50, 5 to 30, 5 to 20, 10 to 100, 10 to 50, 50 to 100, 80 to 100, 90 to 100, 10 to 90, 20 to 80, 15 to 33, 15 to 30, 20 to 50 or 50 to 80%, e.g. about 5, 10, 15, 20, 25, 30, 35, 40, 45, 50, 55, 60, 65, 70, 75, 80, 85, 90, 95 or 100%. The degree of deprotonation or ionisation may be sufficient that, when exposed in suspension to an electrode having an opposite charge, the nanotubes and/or polymer can deposit on said electrode as a result of their electrostatic attraction.

The nanotubes may comprise multiwalled nanotubes (MWNTs). They may comprise single walled nanotubes (SWNTs). They may comprise a mixture of MWNTs and SWNTs. They may be oxidised carbon nanotubes. The nanotubes may have carboxylate groups on the surface thereof. They may have some other anionic group on the surface thereof, e.g. phosphate, sulfate, sulfonate, carbonate or a mixture of anionic groups. They may have more than one of these groups on the surface. The functional groups on the surface of the nanotubes may be such that they inhibit, restrict or prevent aggregation of the nanotubes in the suspension, or in the composite film. The concentration of the functional groups on the surface of the nanotubes may be such that they inhibit, restrict or prevent aggregation of the nanotubes in the suspension, or in the composite film. The nanotubes may have a mean length of between about 0.5 and about 5 microns, or about 0.5 to 2, 0.5 to 1, 1 to 5, 2 to 5 or 1 to 2 microns, e.g. about 0.5, 1, 1.5, 2, 2.5, 3, 3.5, 4, 4.5 or 5 microns.

The polymer may be a thermoset polymer. It may be a thermoplastic polymer. It may be an electrically insulating polymer. It may be an electrically non-conducting polymer. The polymer may be any suitably charged or ionised polymer. The polymer may be a polyamic acid. In this case the process may additionally comprise the step of heating the composite film so as to convert the polyamic acid into a polyimide. The polymer may be a polymer having acidic groups and/or anionic groups formed therefrom. The groups may be carboxylate, phosphate, sulfate, sulfonate, carbonate or a mixture of any two or more of these. Examples of suitable polymers include polyamic acids, polyacrylic or polymethacrylic acid, acrylic or methacrylic acid copolymers, polystyrene sulfonate or styrene sulfonate copolymers etc.

The solvent for the suspension may be a liquid that is a poor solvent for the polymer, allowing formation of a colloidal suspension of the polymer. In this context, a colloidal suspension of the polymer is taken to be a dispersion of particles of the polymer in the liquid. The particles are of colloidal size (commonly under about 2 microns in mean diameter) and are described below. The solvent may be a mixed solvent. The solvent may comprise a polar organic solvent. It may comprise a mixture of solvents, at least one of which is a polar organic solvent. It may comprise a solvent for the polymer and a poor solvent or non-solvent for the polymer. These may be in a suitable ratio so that the solvent is a sufficiently poor solvent for the polymer as to allow formation of a colloidal suspension of the polymer. For many polymers e.g. polyamic acids, a suitable good solvent is a dipolar aprotic solvent such as N-methylpyrrolidone (NMP) and a suitable poor solvent or non-solvent is methanol. The colloidal particles of polymer in the colloidal suspension may have a mean diameter of about 0.2 to about 2 microns, or about 0.5 to 2, 1 to 2, 0.2 to 1, 0.2 to 0.5, 0.5 to 1 or 0.6 to 0.8 microns, e.g. about 0.2, 0.3, 0.4, 0.5, 0.6, 0.7, 0.8, 0.9, 1, 1.1, 1.2, 1.3, 1.4, 1.5, 1.6, 1.7, 1.8, 1.9 or 2 microns. They may have a zeta potential of about −10 to about −30 mV, or about −10 to −20, −20 to −30, −15 to −25 or −18 to −22 mV, e.g. about −10, −15, −16, −17, −18, −19, −20, −21, −22, −23, −24, −25 or −30 mV.

The ratio of nanotubes to polymer in the suspension may be such that the composite film is electrically conductive. It may be sufficient to achieve a desired conductivity of the film. Thus the process may comprise controlling the ratio in order to achieve a desired conductivity. The ratio of nanotubes to polymer in the suspension is such that the composite film adheres to the substrate. The ratio may be between about 0.5% and about 5% on a w/w basis, or about 0.5 to 4, 0.5 to 3, 0.5 to 2, 0.5 to 1.5, 0.5 to 1, 1 to 2, 1 to 5, 2 to 5, 3 to 5, 1 to 3 or 1 to 1.5%, e.g. about 0.5, 1, 1.5, 2, 2.5, 3, 3.5, 4, 4.5 or 5%. The polymer may be present in the suspension at a percentage (w/w or w/v) of about 1 to about 5%, or about 1 to 4, 1 to 3, 1 to 2, 2 to 5, 3 to 5, 4 to 5 or 2 to 4%, e.g. about 1, 1.5, 2, 2.5, 3, 3.5, 4, 4.5 or 5%. The nanotubes may be present in the suspension at a percentage (w/w or w/v) of about 0.005 and 0.1%, or about 0.01 and 0.1, 0.05 and 0.1, 0.005 and 0.05 or 0.005 and 0.001%, e.g. about 0.005, 0.01, 0.05 or 0.1%.

The suspension may be produced by combining a suspension of the carbon nanotubes with a colloidal suspension of the polymer. It may also comprise subjecting the resulting suspension to high shear. The high shear may comprise high shear mixing. It may comprise sonicating the resulting suspension. The sonicating may be conducted for about 5 to about 30 minutes, or about 10 to 30, 20 to 30, 5 to 20 or 5 to 10 minutes, e.g. about 5, 10, 15, 20, 25 or 30 minutes. It may be conducted for sufficient time to form a substantially homogeneous suspension. It may be conducted for sufficient time that the nanotubes are not substantially aggregated, or that they are less aggregated than prior to said sonicating. It will be understood that practically it is very difficult to produce completely unaggregated carbon nanotubes. In the context of the present specification, the term "not substantially aggregated" nanotubes (and related terms) denotes that it is impractical to further reduce their degree of aggregation substantially. The term should not be interpreted to mean that no aggregation of the nanotubes is present. The sonicating may be at a frequency of about 20 to about 50 kHz, or about 20 to 40, 30 to 50 or 30 to 40 kHz, e.g. about 20, 25, 30, 35, 40, 45 or 50 kHz. It may be at a power of about 50 to about 200 W, or about 50 to 150, 50 to 100, 100 to 200, 150 to 200 or 100 to 150 W, e.g. about 50, 100, 150 or 200 W. It may be at a power and frequency sufficient to form a substantially homogeneous suspension. It may be at a power and frequency sufficient that the nanotubes are not substantially aggregated, i.e. that it is impractical to substantially deaggregate them further. It may be at a power and frequency sufficient that the CNTs are not significantly damaged.

The functionalised carbon nanotubes may be prepared by functionalisation, e.g. surface functionalisation, e.g. oxidation of normal (i.e. unfunctionalised) carbon nanotubes. This may be achieved by exposing the normal nanotubes to a mild oxidant, for example nitric acid. The nitric acid may be at a concentration of about 1 to about 5M (e.g. about 1 to 3, 3 to 5, 2 to 4 or 2 to 3M, for example 1, 1.5, 2, 2.5, 3, 3.5, 4, 4.5 or 5M). The exposing may be accompanied by mild stifling or shaking, and may be conducted for about 0.5 to about 2 hours (e.g. about 0.5 to 1 or 1 to 2 hours, for example about 30, 40 or 50 minutes, or about 1, 1.2, 1.4, 1.6, 1.8 or 2 hours). Other oxidation processes may be used for oxidising the carbon nanotubes. For example potassium chlorate, hydrogen peroxide, oxygen/UV light, acidic permanganate, chlorosulfonic acid, peracetic acid, peroxymonosulfuric acid, performic acid, perbenzoic acid, persulfate, perborate or other oxidants may be used to oxidise the carbon nanotubes. The oxidation should be sufficient to inhibit aggregation of the nanotubes, or sufficient to prevent substantial aggregation of the nanotubes, or sufficient to restrict aggregation of the nanotubes or sufficient to reverse aggregation of the nanotubes. During the oxidation, the suspension may be subjected to high shear. The high shear may comprise high shear mixing. It may comprise sonicating the suspension. The sonication may be for about 1 to about 3 hours (e.g. about 1 to 2, 2 to 3 or 1.5 to 2.5 hours or more than 3 hours, for example about 1, 1.5, 2, 2.5, 3, 3.5, 4, 4.5 or 5 hours). This may serve to at least partially deaggregate the carbon nanotubes. The sonicating may be at a frequency of about 20 to about 50 kHz, or about 20 to 40, 30 to 50 or 30 to 40 kHz, e.g. about 20, 25, 30, 35, 40, 45 or 50 kHz. It may be at a power of about 50 to about 200 W, or about 50 to 150, 50 to 100, 100 to 200, 150 to 200 or 100 to 150 W, e.g. about 50, 100, 150 or 200 W. It may be at a power and frequency sufficient to form a substantially homogeneous suspension. It may be at a power and frequency sufficient that the nanotubes are not substantially aggregated. It may be at a power and frequency sufficient that the nanotubes are less aggregated than prior to said sonicating. The resulting nanotubes may be isolated by centrifugation, filtration, microfiltration, ultrafiltration, decanting or a combination of these. They may be washed, commonly with water (preferably high purity water such as distilled water or deionised water) and dried. Drying may be accomplished by freeze drying, passing a dry gas through or over the nanotubes or by some other suitable method or combination of methods.

Following functionalisation of the carbon nanotubes, as described above, a suspension of the nanotubes may be prepared. This may comprise stirring the nanotubes in a first solvent for a suitable time to achieve dispersion (e.g. for about 8 to about 24 hours, or about 8 to 16, 16 to 24 or 12 to 18 hours, suitably 8, 10, 12, 14, 16, 18, 20, 22 or 24 hours). The first solvent may be a good solvent for the acid form of the charged polymer. The nanotubes may be present in the first solvent at about 0.01 to about 1%, or about 0.01 to 0.1, 0.1 to 1 or 0.05 to 0.5%, e.g. about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9 or 1% on a w/w or w/v basis. The resulting suspension may then be diluted in a second solvent. The second solvent may be a poor solvent or a non-solvent for the acid form of the polymer. The ratio of first solvent to second solvent may be between about 10 and about 50%, e.g. about 10 to 30, 30 to 40, to 40 or 25 to 35% (w/w or v/v). The concentration of carbon nanotubes in the resulting suspension may be between about 0.01 and about 0.1% w/w or w/v, or about 0.01 to 0.05, 0.05 to 0.1, 0.02 to 0.08 or 0.03 to 0.07, e.g. about 0.01, 0.02, 0.03, 0.04, 0.05, 0.06, 0.07, 0.08, 0.09 or 0.1%. Following addition of the second solvent, the suspension may be sonicated for sufficient time to homogenise the nanotubes in the suspension. Typically this a quite short period, e.g. about 1 to about 10 minutes, or about 1 to 5, 4 to 10, 2 to 8 or 3 to 7 minutes (for example about 1, 2, 3, 4, 5, 6, 7, 8, 9 or 10 minutes). Suitable first solvents and second solvents may depend on the nature of the polymer used in forming the composite film. For polyamic acids, suitable first solvents include dipolar aprotic solvents such as NMP (N-methylpyrrolidone), DMA (N,N'-dimethylacetamide), DMF (N,N'-dimethylformamide), DMSO (dimethyl sulfoxide), TMU (tetramethylurea) and tetrahydrothiophen-1,1-oxide, and suitable second solvents include short chain alcohols such as methanol or ethanol.

The process may also comprise preparing the colloidal suspension of the polymer. The process for doing so may depend on the nature of the polymer. One common method for preparing the colloidal suspension of the polymer is to prepare a solution of an acid (i.e. non-charged) form of the polymer in a good solvent and then at least partially neutralise the acid form to form the charged polymer. The polymer itself may be provided e.g. from commercial sources or may be generated in situ. For example a polyamic acid may be generated in situ by reaction of a bisanhydride with a diamine. The neutralisation, as mentioned above, may be between about 5 and about 100%, and accordingly, this step may comprise combining the solution of the acid form of the polymer with between about 0.05 and about 1 mol equivalents of a base capable of deprotonating the acid form. The base may be an amine, e.g. a tertiary amine, or some other suitable base. It may be a hydroxide such as sodium or potassium hydroxide. It may be triethylamine, trimethylamine, pyridine, aniline, dimethylaniline, N-dimethylethanol, triethanolamine, N-dimethylbenzylamine, and N-methylmorpholine or some other suitable base. The base may be combined with the solution in neat form or in solution, either in a good solvent for the acid form of the polymer or in a poor solvent or non-solvent for the acid form. The resulting polymer preparation may be combined with a poor solvent or non-solvent for the acid form of the polymer in order to form a stable colloidal suspension of the ionised polymer. Thus in one alternative, a solution of an acid form of the polymer in a solvent is treated with base so as to form the charged polymer, which is less soluble in the solvent and therefore generates a colloidal suspension. This may be stabilised by addition of a solvent that is a non-solvent or poor solvent for the charged polymer. In another alternative, a solution of an acid form of the polymer in a solvent is treated with a base so as to form the charged polymer which remains in solution. The resulting solution is then combined with sufficient of a solvent that is a non-solvent or poor solvent for the charged polymer that a colloidal suspension results. In either of the above alternatives, the ratio of good solvent to poor solvent will depend on the solubility of the charged polymer in the two as well as on the concentration of polymer in the solution. Clearly it is required that the poor solvent or non-solvent is miscible with the good solvent in the ratio that is used. The ratio may typically be about 1:1 to about 1:5, or about 1:1 to 1:3, 1:3 to 1:1, 1:2.5 to 1.3, 1:2 to 1:3.5 or 1:2 to 1:4, e.g. about 1:1, 1:1.5, 1:2, 1:2.5, 1:3, 1:3.5, 1:4, 1:4.5 or 1:5 on a weight or volume basis.

Once the suspension comprising the ionised polymer and functionalised carbon nanotubes in a solvent has been prepared, as described above, the substrate and a counterelectrode are at least partially immersed in the suspension. The substrate may be made of any suitable conductive material, or may comprise a conductive material coated on a second substance (either conductive or non-conductive). It will be understood that only that portion of the substrate that is immersed in the suspension may be coated with the composite film. The substrate may be any suitable shape. It may be rough or it may be smooth. It may be flat or it may be non-flat. It may have sharp edges or it may have no sharp edges. The substrate may be partially immersed in the suspension, whereby the substrate will be only partly coated with the composite film. The substrate may be entirely immersed in the suspension, whereby the substrate may be entirely coated with the suspension. The substrate may comprise a metal. It may comprise copper. It may comprise chromium. It may comprise a metal coated silicon wafer. It may comprise a chromium coated silicon wafer. It may comprise a conductive polymer. It may comprise some other conductive material. It may comprise a blend of conductive materials (e.g. an alloy). It may comprise more than one of the above. It may comprise a conductive material at least partially coated with a non-conductive material. For example it may comprise a polymer coated metal. The counterelectrode may be as described above for the substrate. The substrate and/or the counterelectrode may be cleaned prior to forming the film. The cleaning may for example comprise acid cleaning with a suitable acid that does not dissolve the relevant item. It may also comprise washing the item after the acid cleaning. A spacer may be present between the substrate and the counterelectrode. The spacer may be made of an electrically non-conductive material e.g. a polymeric material or a ceramic material. The spacer serves to maintain a suitable spacing between the substrate and the counterelectrode. The spacing may depend on the conditions used in forming the composite film on the substrate. It may be between about 0.5 and about 5 cm, or about 0.5 to 3, 0.5 to 2, 2 to 5, 3 to 5 or 1 to 3 cm, e.g. about 0.5, 1, 1.5, 2, 2.5, 3, 3.5, 4, 4.5 or 5 cm.

A voltage (i.e. a potential difference) is then applied between the substrate and the counterelectrode so as to form the composite film on the substrate. Thus in the present invention the formation of the film on the substrate may be a single step process. The voltage is applied such that the charge on the substrate has the opposite sign to the charge on the polymer and the nanotubes. Thus, for example, if the polymer and the nanotubes are both negatively charged, the voltage should be applied such that the charge on the substrate is positive (i.e. the substrate may function as an anode). In this case the counterelectrode will be the cathode. The voltage may be applied by connecting the counterelectrode and the substrate to a voltage source. The voltage should be such that the sign of the charge on the substrate does not vary through the coating process (i.e. it is always positive or it is always negative). The voltage may therefore be a DC voltage and the voltage source a DC voltage source. The magnitude of the voltage may be constant or it may vary. It may vary regularly or irregularly. It may vary monotonically or may vary non-monotonically, e.g. sinusoidally, as a square wave, a sawtooth wave or in some other manner. The voltage (or the mean voltage) may be between about 20 and about 400 volts, or about 20 to 200, 20 to 100, 20 to 50, 50 to 400, 100 to 400, 200 to 400, 50 to 200, 50 to 100 or 100 to 200 volts, e.g. about 20, 30, 40, 50, 60, 70, 80, 90, 100, 150, 200, 250, 300, 350 or 400 volts. The current flow may be between about 1 and about 200 mA, or about 1 to 100, 1 to 50, 1 to 20, 1 to 10, 10 to 200, 50 to 200, 100 to 200, 10 to 100, 10 to 50, 50 to 100 or 50 to 150 mA, e.g. about 1, 2, 3, 4, 5, 6, 7, 8, 9, 10, 15, 20, 25, 30, 35, 40, 45, 50, 60, 70, 80, 90, 100, 110, 120, 130, 140, 150, 160, 170, 180, 190 or 200 mA. Alternatively there may be negligible current flow or no current flow. In this case the system may be regarded as a capacitative system in which the electrodes become electrically charged by application of a suitable voltage, but no substantial current flows. This may be the case in circumstances in which any one or more (optionally all) of the substrate, the counterelectrode and the suspension are electrically insulating or have low electrical conductivity. During the step of applying the voltage, the suspension may be kept at a temperature of between about 10 and about 50° C., or about 10 to 35, 10 to 20, 15 to 50, 15 to 35, 25 to 50, 35 to 50, 25 to 25 or 25 to 35° C., e.g. about 10, 15, 20, 25, 30, 35, 40, 45 or 50° C. The voltage may be applied for a suitable time to achieve the desired thickness of film. Clearly the longer the time of applying the voltage, the thicker the film will be. Typical times are from about 30 seconds to about 30 minutes, or about 1 to 30, 5 to 30, 10 to 30, 20 to 30, 0.5 to 20, 0.5 to 10, 0.5 to 5, 0.5 to 2, 0.5 to 1, 1 to 20, 1 to 10 or 5 to 10 minutes, e.g. about 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29 or 30 minutes.

Following formation of the film, the film (on the substrate) may be removed from the suspension. It may be then washed with a suitable liquid which does not dissolve the film to an appreciable extent. Suitable liquids will depend on the nature of the polymer. They include short chain alcohols such as methanol and ethanol. The film may then be dried e.g. in air.

In the event that the polymer is a polyamic acid or some other thermally curable polymer, it may be advantageous to cure the polymer (in the case of a polyamic acid, to convert the polymer into a polyimide). This may be accomplished by heating to a suitable temperature for a suitable time. The time and temperature will depend on the chemical nature of the polymer, and may depend on the thickness and other dimensions of the film. It may be preferable to heat at different temperatures sequentially, e.g. about 100° C. for about 30 minutes, then about 200° C. for about 30 minutes and then about 280° C. for about 60 minutes. Depending on the nature of the polyamic acid, the temperature required to convert to a polyimide may be between about 120 and about 250° C. and further baking at higher temperature (e.g. about 250 to about 300° C.) may be advantageous in obtaining good physical properties.

The present invention also provides a composite film comprising carbon nanotubes dispersed in a polymer, said nanotubes being substantially homogeneously distributed through the polymer. The nanotubes may be not substantially aggregated within the polymer. The composite film may be made by the process described above.

The nanotubes may be as described above in conjunction with the process. The film may be electrically conductive. It may have an electrical conductivity of at least about $10^{-3}$ $Sm^{-1}$, or at least about $5*10^{-3}$, $10^{-2}$, $5*10^{-2}$, 0.1, 0.5, 1, 5, 10, 50, 100, 200, 500 or 1000 $Sm^{-1}$. It may have an electrical conductivity of about 0.001 to 1000, 0.001 to 100, 0.001 to 10, 0.001 to 1, 0.001 to 0.01, 0.01 to 1000, 1 to 1000, 100 to 1000, 0.1 to 100, 0.1 to 10, 0.1 to 1 or 1 to 100 $Sm^{-1}$, e.g. about 0.001, 0.002, 0.005, 0.01, 0.02, 0.05, 0.1, 0.2, 0.5, 1, 2, 5, 10, 20, 50, 100, 200, 500 or 1000 $Sm^{-1}$. The electrical conductivity will depend on the concentration of carbon nanotubes in the film. The nanotubes may be in sufficient concentration in the film that they form a continuous three dimensional conductive network. The film may have an electrical conductivity of at least about $1 \times 10^{-3}$ $Sm^{-1}$ and a carbon nanotube content of about 0.65 wt %, or about 0.8 wt %, or about 1 wt % or about 1.2 wt % relative to polymer. Alternatively the conductivity may be less than $10^{-3}$ $Sm^{-1}$, or less than about $10^{-4}$, $10^{-5}$, $10^{-6}$ or $10^{-7}$ $Sm^{-1}$ for example the conductivity may be about $10^{-4}$, $10^{-5}$, $10^{-6}$ or $10^{-7}$ $Sm^{-1}$, when carbon nanotube concentrations are used that are insufficient form a continuous three dimensional conductive network or that are less than about 0.65% relative to polymer.

The carbon nanotubes and the polymer may be as described earlier. The carbon nanotubes may have carboxyl groups on the surface thereof. They may have ester groups, or may have amide groups. The carbon nanotubes may be functionalised carbon nanotubes. The carbon nanotubes, or at least some of the carbon nanotubes, may be covalently bonded to the polymer. They may be covalently bonded through anhydride linkages, or through amide linkages or through ester linkages or through some other suitable type of linkage.

The film may have a thickness of less than about 100 microns, or less than about 50 microns, or less than about 40, 30, 20 or 10 microns, or between about 5 and about 100 microns, or about 5 to 50, 5 to 40, 5 to 30, 5 to 20, 5 to 10, 10 to 50, 20 to 50 or 10 to 30 microns, e.g. about 5, 10, 15, 20, 25, 30, 35, 40, 45 or 50 microns. Alternatively the film may have a thickness of at least about 50 microns, or at least about 60, 70, 80, 90 or 100 microns, or may be about 50 to 200 microns, or about 75 to 200, 100 to 200, 150 to 200, 50 to 100, 75 to 150 or 75 to 100 microns, e.g. about 50, 60, 70, 80, 90, 100, 110, 120, 130, 140, 150, 160, 170, 180, 190 or 200 microns. The thickness of the film may be tailorable by controlling the conditions and time of film formation. The film may have a substantially uniform thickness.

The film may have no filler other than the carbon nanotubes. It may have no electrically conductive filler other than the carbon nanotubes. It may comprise a non-conductive filler (e.g. silica, talc, calcium carbonate etc.). It may comprise a second electrically conductive filler (e.g. metallic particles or particles of conductive polymer). In the event that the film comprises a filler other than the carbon nanotubes, these may have charged functional groups on the surface thereof, or functional groups derived from said charged functional groups, wherein the charge on said charged functional groups is the same sign as the charge on the carbon nanotubes.

The film may be on a metallic, e.g. copper, substrate. It may have no primer or other layer between the film and the substrate. It may have good adhesion to the substrate. Thus in an embodiment of the invention a composite film comprising carbon nanotubes dispersed in a polyimide is located directly on a metallic, e.g. copper, substrate, said film having good adhesion to the substrate. The film may have sufficiently good adhesion to the substrate that it does not delaminate from the substrate either during high temperature formation of the polyimide or during normal use of the coated substrate.

The film may have improved physical properties relative to a film of the same polymer having no CNTs. The film may have improved elastic modulus and/or hardness relative to a film of the same polymer having no CNTs. The improvement may be at least about 5%, or at least about 6, 7, 8, 9, 10, 15 or 20% or may be about 5 to about 20%, or about 5 to 15, 5 to 10, 10 to 20 or 8 to 13%, e.g. about 5, 6, 7, 8, 9, 10, 11, 12, 13, 14, 15, 16, 17, 18, 19 or 20%. The improvement may be dependent on the loading of CNT in the polymer

BRIEF DESCRIPTION OF THE DRAWINGS

A preferred embodiment of the present invention will now be described, by way of an example only, with reference to the accompanying drawings wherein.

DETAILED DESCRIPTION OF THE PREFERRED EMBODIMENTS

Figure 1:
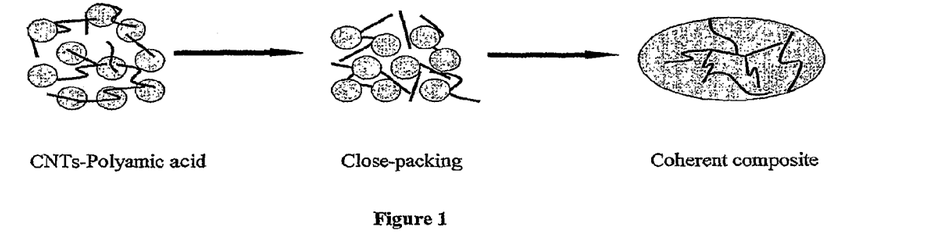
FIG. 1 is a schematic illustration of the fabrication of conductive CNTs polymer composite through electrophoretic deposition.

The carbon nanotube (CNTs)/polymer composite thin films disclosed herein may be fabricated by electrophoretic deposition (EPD) of CNTs and a polymer colloid suspension in a DC electric field. A schematic illustration of formation of the conductive CNT/polymer composite thin film is shown in FIG. 1.

An EPD suspension according to the present invention may comprise negatively charged CNTs having oxycarbonyl group on their surface. Here, the term "oxycarbonyl group" refers to a group which provides free $COO^-$ groups in the EPD suspension. A preferred oxycarbonyl group is the carboxyl group (COOH). The CNTs may be SWNT or MWNT. MWNT are preferred for fabricating electrically conductive composite thin films.

Carboxylated MWNT may be prepared from commercially available MWNT through acid-oxidation. This may be achieved by sonicating the MWNT lightly in the presence of nitric acid or mixed sulfuric acid and nitric acid, followed by thorough washing with water. The degree of the acid treatment is dependent on treating time, treating temperature and acid concentration. To maintain the integrity of the graphite structure of MWNT, use of dilute nitric acid and sonicating for short time are preferred. The acid-treated MWNT may be thoroughly dried, e.g. by freeze drying followed by further drying at high temperature under high vacuum. Alternatively, the carboxylated CNTs may be prepared through a radical reaction as reported previously (Peng H Q, Alemany L. B., Margrave J. L. and Khabashesku V. N., Sidewall carboxylic acid functionalization of single walled carbon nanotubes, *J Am Chem Soc*, 2003, 125, 15174).

The MWNT suspension for EPD may be prepared by suspending acid-treated MWNT in a polar organic solvent. The polar organic solvent may be the same as that used in preparation of polyamic acid (PAA) suspension. The MWNT suspension may be prepared under high power sonication for about 1 to 6 minutes.

The EPD suspension according to a preferred embodiment of the present invention comprises a negatively charged polyamic acid (PAA) colloid which is obtained by neutralisation of PAA. PAA may be obtained from commercially available sources or by laboratory synthesis. For example, Pyre-ML® products, which are part of a family of materials based on aromatic polyimides, can be purchased from Industrial Summit Technology Co. These products include Pyre-ML® Wire Enamels, Liquid 'H' Enamel, Insulating Varnish, and Thinner for different application.

To synthesize PAA, substantially equal amounts of an aromatic tetracarboxylic dianhydride and an aromatic diamine (on a molar basis) are subjected to polycondensation in an organic polar solvent at room temperature. Molecular weight control may optionally be performed by adjusting the stoichiometry of the acid dianhydride and diamine or adding a terminator such as maleic anhydride. Thus the molar ratio may be about 0.8 to about 1.2, or about 0.9 to about 1.1, or about 0.95 to about 1.05, e.g. about 0.8, 0.85, 0.9, 0.95, 0.96, 0.97, 0.98, 0.99, 1, 1.01, 1.02, 1.03, 1.04, 1.05, 1.1, 1.15 or 1.2.

While there are no particular limitations on the aromatic tetracarboxylic dianhydride that may be used, the following compounds are provided as typical examples: pyromellitic dianhydride, 3,4,3',4'-biphenyltetracarboxylic dianhydride, 3,4,3',4'-benzophenonetetra-carboxylic dianhydride, and 4,4'-(hexafluoroiso-propylidene)diphthalic anhydride. While there are no particular limitations on the aromatic diamines that may be used, the following are provided as typical examples: 1,2-, 1,3- and 1,4-phenylenediamine, 2,4-diaminotoluene, 2,5-diaminotoluene, 4,4'-oxydianiline, and 2,2-bis [4-(4-aminophenoxy)phenyl]hexa-fluoropropane. Typical organic polar solvents include N-methylpyrrolidone, N,N'- dimethylacetamide, N,N'-dimethylformamide, dimethyl sulfoxide, tetramethylurea, tetrahydrothiophen-1,1-oxide. Preferably, less toxic N-methyl-pyrrolidone or N,N'-dimethylformamide is used.

Figure 2:
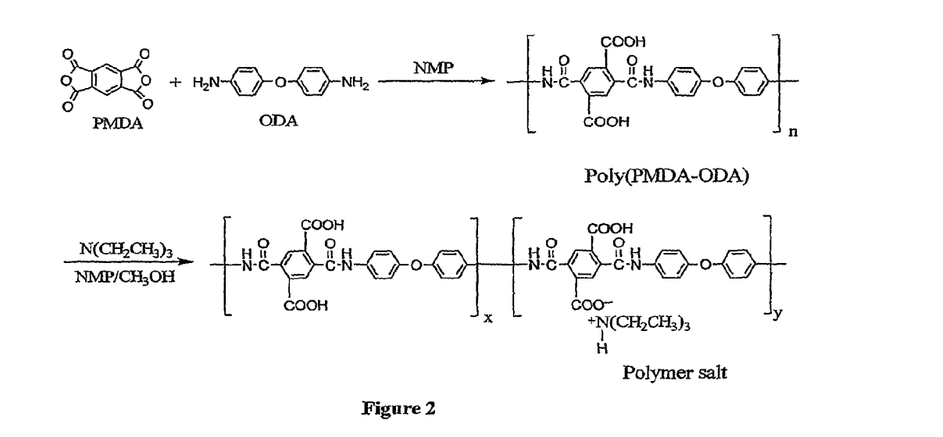
FIG. 2 is a schematic illustration of the syntheses of polyamic acid and its neutralization.

PAA colloids are prepared by dropping the above polyamic acid solution into a poor solvent comprising a neutralizing agent to ionize the PAA. Alternatively the polyamic acid may be neutralised by combining the solution with a neutralizing agent and the resulting mixture added to the poor solvent. Water, aliphatic alcohols, benzyl alcohol and substituted benzyl alcohol are typical examples of poor solvents which are particularly suitable for use in the formation of stable emulsion. Methanol is suitable. Typically, the weight ratio of poor solvent to polar solvent ranges from 2 to 3.5, preferably, from 2.5 to 3. Exemplary neutralizing agents include N-dimethyl ethanol, triethylamine, triethanolamine, N-dimethyl-benzylamine, and N-methylmorpholine. Triethylamine is a preferred neutralizing agent. Typically, ionized parts of polyamic acid range from 10 to 50 wt %, preferably, from 15 to 33 wt %. FIG. 2 shows the synthesis of PAA and its neutralization by a basic compound leading to ionized PAA.

The EPD suspension according to the present invention is prepared by mixing acid-treated MWNT suspension and PAA colloids under water bath sonicating for 5 to 30 minutes. 20 minutes is a preferred time. The solid content of PAA in the electrodeposition bath, i.e. the EPD suspension, may be adjusted from about 1 to 5 wt %, preferably from about 2 to 3.5 wt %; the content of MWNT may be adjusted from about 0.5 to 2.0 wt % of PAA, preferably about 0.6 to 1.2 wt %. The content of MWNT may be lower than 0.5 wt % if a film of lower conductivity is required. The suspension thus prepared has good storage stability. In a closed container, it may be stored stably at room temperature for up to two weeks.

General processes of electroplating polyimides which are similar to heretofore known EPD processes may be applied without substantial modification. In an example, a piece of metal coated silica wafer as a cathode and a workpiece (metal coated silica wafer or copper plate) as an anode are immersed in the above suspension bath at a temperature range of about 15-35° C. and a current range of about 1-200 mA, preferably about 2-20 mA, or a voltage range of about 20-400 volts, preferably about 20-200 volts, for a period of about 30 seconds to 20 minutes, preferably about 1-10 minutes. The deposited film is then washed with methanol, and if necessary imidization was accomplished in an air oven at about 100° C. for about 30 minutes, about 200° C. for about 30 minutes, and about 280° C. for about 60 minutes. The deposition may be carried out without stirring or slight stirring. Alternatively, the deposition may be conducted using suspension flow motivated by electrical pump. The latter alternative may be preferred in large scale systems which employ a large amount of suspension. Thus the EPD suspension may be agitated or may be not agitated.

Thus a representative procedure for producing a composite film according to the present invention comprises the following steps:

Preparation of charged carbon nanotubes: stirring a mixture of multiwalled carbon nanotubes in dilute aqueous nitric acid (about 1 to about 5M) for about 0.5 to about 2 hours, followed by sonication for about 1 to about 3 hours, filtering, washing and drying the solids;

Preparation of charged polymer colloids: reacting approximately equimolar amounts of a diamine and a bis-anhydride in a solvent for about 0.5 to about 2 days at room temperature, at least partial neutralisation of the resulting polyamic acid with a triorganoamine (e.g. triethylamine), and addition to the resulting solution of sufficient quantity of a poor solvent or non-solvent for the resulting anionic polyamic acid to cause formation of a colloidal suspension of the anionic polyamic acid;

Preparation of suspension comprising negatively charged polymer and negatively charged carbon nanotubes: optionally adding further non-solvent or poor solvent to the colloidal suspension of polymer, suspending the carbon nanotubes in a solvent, commonly a mixed solvent having approximately the same composition as that of the colloidal suspension of the polymer, and combining the suspension of polymer and the suspension of carbon nanotubes in a suitable ratio to achieve the desired ratio of carbon nanotubes to polymer (commonly the ratio of carbon nanotubes to polymer is about 0.2 to about 2 wt %);

Film formation: sonicating the suspension comprising negatively charged polymer and negatively charged carbon nanotubes for about 15 to about 30 minutes, immersing a substrate anode and a cathode into the suspension and applying a DC voltage sufficient to achieve a current of about 10 to about 20 mA across the electrodes for about 1 to about 5 minutes in order to form a composite film on the anode.

The EPD procedure is illustrated in FIG. 1. As shown in FIG. 1, initially the MWNT and PAA colloid are uniformly suspended in methanol/NMP. Under the influence of an electric field it is envisaged that negatively charged PAA colloid and MWNT migrate to opposite charged anode (the workpiece) and closely pack on the surface of the workpiece. It is thought that because of the excluded volume created by PAA particles, the MWNT are pushed into the interstitial space between PAA particles, which dramatically reduces the space available for MWNT to form conductive networks, resulting in a reduced percolation threshold. After heat curing at high temperature, a coherent MWNT/PI composite film is prepared.

Figure 3:
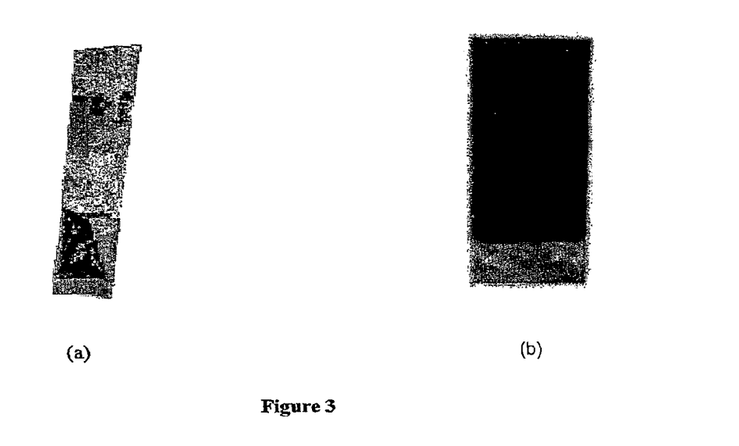
FIG. 3 shows photographs of electrophoretic deposited pure polyimide film (a) and polyimide/MWNT composite film (b) on copper substrate with feeding content of MWNT of 0.65 wt % of PAA, current of 15 mA and deposition time of 3 minutes.

FIG. 3 shows optical photographs of fabricated MWNT/PI composite thin film and pure PI thin film on copper. While a delaminated or even cracked pure PI thin film is observed as shown in FIG. 3a, a smooth MWNT/PI composite thin film is observed in FIG. 3b, indicating that incorporation of MWNT into PI by means of EPD enhances the thermal stability and adhesion strength of PI film onto the metallic substrate. The poor adhesion of PI to copper is thought to be due to the increased corrosion of PI in the presence of $Cu^{2+}$ at high curing temperature. The improved adhesion of the films of the present invention may relate to the formation of surface hydroxides on the electrode (copper) under the influence of the electric field. These may then hydrogen bond to the acid treated MWNT. It is also possible that residual carbonyl groups or hydroxyl groups on the MWNT surface prevent the diffusion of $Cu^{2+}$ into PI layer through their strong interaction with $Cu^{2+}$.

Figure 4:
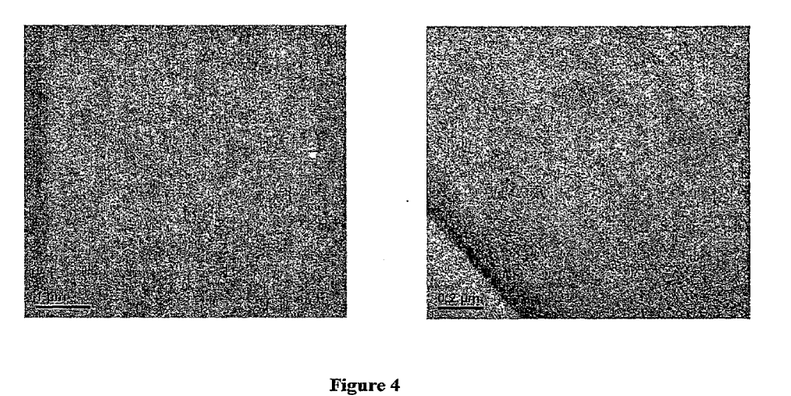
FIG. 4 shows TEM micrographs of MWNT/polyimide composite fabricated through EPD processing with feeding content of MWNT of 0.65 wt % of PAA.

During EPD processing, an anode reaction is thought to lead to the regeneration of the COOH from $COO^-$ on the surface of MWNT. Some of the resulting COOH groups from the MWNT may be involved in imidization with PI. As a result, the interfacial interaction between MWNT and PI is thought to be enhanced by the formation of amide groups, which further facilitates MWNT dispersion in PI. The microstructure of a prepared MWNT/PI composite may be observed by using TEM. Examples of such TEM micrographs are shown in FIG. 4. The TEM results suggest that an effective MWNT dispersion of conductive network is developed by means of EPD processing.

Figure 5:
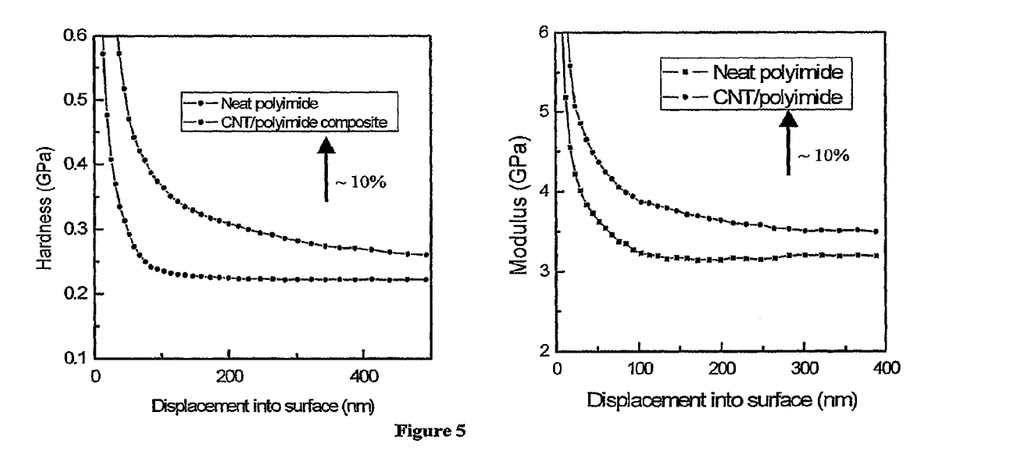
FIG. 5 shows modulus and hardness profiles with respect to displacement into sample surfaces for neat PI thin film and MWNT/PI composites thin film with MWNT feeding content of 0.65 wt % of PAA fabricated onto metal coated silicon wafer through EPD processing.

The mechanical properties of neat PI and MWNT/PI composite thin films fabricated through EPD processing were characterized by nanoindentation testing. FIG. 5 shows the modulus (E) and hardness (H) profiles with respect to the indentation depth, respectively, for neat PI and MWNT/PI composite thin film with MWNT loading of 0.65 wt % relative to PAA. It can be seen that both the elastic modulus and the hardness of MWNT/PI composite thin film are improved by about 10% compared with a neat PI thin film, suggesting that incorporation of MWNT has enhanced the mechanical property of PI. This may also relate to the thermal stability of MWNT/PI composite thin film.

Figure 6:
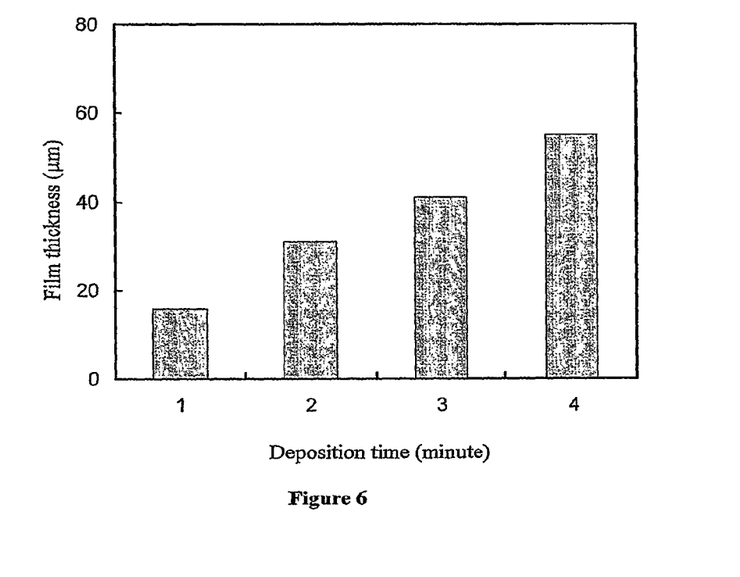
FIG. 6 shows the dependence of the thickness of MWNT/PI composite thin film against deposition time (DC current: 15 mA, MWNT feeding content: 1 wt % of PAA).

The thickness of fabricated film may be varied by changing one or more of the suspension concentration, DC current, conductivity of the electrode and deposition time. FIG. 6 shows the thickness of MWNT/PI composite thin film fabricated onto Cr coated silicon wafer through EPD processing with DC current of 15 mA and MWNT feeding content of 1 wt % of PAA with various deposition times. It can be seen that film thickness increases from about 16 µm to about 55 µm with deposition time increases from about 1 is minute to about 4 minutes, suggesting that the EPD processing is capable of producing thin film with tunable thickness. The thickness is also influenced by the conductivity of substrate. For example, while the thickness is about 55 µm for film deposited onto Cr coated silicon wafer (deposition time 4 minutes), it is about 73 µm for film deposited onto copper with MWNT feeding content of 1 wt % of PAA.

The neat PI film is electrically insulating. In contrast, the MWNT/PI film fabricated through EPD processing is electrically conductive when the MWNT feeding content is 0.65 wt % of PAA or above. Table 1 shows the electrical conductivity of MWNT/PI composite thin films fabricated onto Cr coated silicon wafer through EPD processing with DC current of 15 mA for 4 minutes but with different MWNT content. It can be seen that the conductivity increases from $1 \times 10^{-3}$ $Sm^{-1}$ to $1.6 \times 10^2$ $Sm^{-1}$ with the MWNT content increases from 0.65 to 1.2 wt % of PAA, suggesting the EPD processing can produce thin film with tunable conductivity. This is because at higher MWNT loading, more MWNT migrate to anodic electrode and deposit with PI colloids to form MWNT/PI composite thin film with higher MWNT content.

TABLE 1

Conductivity of MWNT/PI thin film fabricated onto Cr-coated silicon wafer with different MWNT feeding content.

| | MWNT content (wt %) | | | |
|---|---|---|---|---|
| | 0.65 | 0.8 | 1.0 | 1.2 |
| Conductivity ($Sm^{-1}$) | $1 \times 10^{-3}$ | $2.1 \times 10^{-2}$ | $5 \times 10^{-1}$ | $1.6 \times 10^2$ |

This invention is further described by the following examples for embodiment but not limiting its scope.

Example 1

600 mg of pristine MWNT was mixed with 240 ml nitric acid (2.6 M). The mixture was stirred for 1 hr using mechanical stirrer at rate of 400 rpm. After that, the mixture was stirred for 2 more hrs under sonicating in a water bath ultrasonicator. The mixture was then vacuum-filtered through a 0.22 µm polycarbonate membrane, and washed with distilled water until the pH value of the filtrate was ca. 7. Finally the acid-treated MWNT was freeze-dried and then further dried at 45° C. for 48 hrs under high vacuum.

Example 2

4.2 mg acid-treated MWNT was suspended in 5.0 g NMP by stirring overnight. Then 15.0 g $CH_3OH$ was added and the resulting mixture was sonicated for 5 minutes using high power sonicator to prepare a MWNT suspension for EPD processing. MWNT suspensions with different MWNT contents were prepared by changing the MWNT weight in the above procedure.

Example 3

In a 250 ml three-neck round-bottom-flask, 10.0 g 4,4'-oxydianiline (ODA, 0.05 mole) and 140 ml N-methylpyrrolidone (NMP) were mixed. After the ODA was completely dissolved in the NMP, 10.9 g pyromellitic dianhydride (PMDA, 0.05 mole) was added and kept stirring for 24 hours. Finally, the resulting polyamic acid (PAA), PMDA-ODA, was store in a blue cap reagent bottle in a freezer below −10° C.

Example 4

10 g prepared PMDA-ODA NMP solution (12.65 wt %) according to Example 3 was diluted with 6.5 ml NMP and neutralized by adding 169 µL triethylamine. The ionized carboxylic group was about 20%. Then, stable colloidal EPD suspension was prepared by dropping 58.8 ml methanol (weight ratio of methanol and NMP about 3) into the above PMDA-ODA NMP solution. The final content of PAA was 2 wt %. The effective diameter and the average zeta potential of the prepared PAA particles were about 0.7 µm and −20.5 mV, respectively, measured by Zetaplus Particle Sizing equipment.

Example 5

The PAA colloid prepared according to Example 4 was diluted to 1 wt % by mixing with equal volume of $CH_3OH$/NMP with weight ratio of 3 and put into a beaker and its temperature was controlled by further putting the beaker into a water bath. A Cr-coating silica wafer used as a cathode and a workpiece (metal coated silica wafer or copper plate) as an anode were immersed into the EPD suspension and separated by a spacer with length of 1.5 cm (i.e. of suitable dimensions to provide a spacing between the coated silica wafer and the workpiece of about 1.5 cm). Then, EPD processing was carried out under a constant electric current generated by a DC source supplied by of LAMBDA Invensys Genesys™. EPD processing was conducted at different DC current and deposition time.

The EPD suspension for neat PI film had the following characteristics: polyamic acid content 1%; ionized parts 15-33%; weight ratio of methanol to NMP 3.0; temperature, 22° C.

Example 6

The EPD suspension prepared according to Example 4 was mixed with equal volume of MWNT suspension prepared according to Example 2 under water bath sonication for 20 minutes. The obtained mixed suspension was then transferred to a beaker and its temperature was controlled by further putting the beaker into a water bath. A Cr-coating silica wafer used as a cathode and a workpiece (metal coating silica wafer or copper plate) as an anode were immersed into EPD suspension and separated by a spacer with length of 1.5 cm. Then, EPD processing was carried out under a constant electric current generated by a DC source supplied by LAMBDA Invensys Genesys™. EPD processing was conducted at varied DC current, deposition time and MWNT content.

The EPD suspension for MWNT/PI film had the following characteristics: polyamic acid content 1 wt %; ionized parts 15-33%; weight ratio of methanol to NMP 3.0; MWNT content 0.5 to 1.5 wt % relative to polymer; temperature, 22° C.

The invention claimed is:

1. A process for forming a composite film on a substrate comprising:
   (i) providing a suspension comprising an ionised polymer and functionalised carbon nanotubes in a solvent;
   (ii) at least partially immersing the substrate and a counterelectrode in the suspension; and
   (iii) applying a voltage between the substrate and the counterelectrode so as to form the composite film on the substrate;
   wherein the polymer and the nanotubes are both negatively charged and the voltage is applied such that the charge on the substrate is positive.

2. The process of claim 1 wherein the nanotubes comprise multiwalled nanotubes (MWNTs).

3. The process of claim 1 wherein the nanotubes have carboxylate groups on the surface thereof.

4. The process of claim 1 wherein the polymer is a polyamic acid.

5. The process of claim 4 additionally comprising the step of heating the composite film so as to convert the polyamic acid into a polyimide.

6. The process of claim 1 wherein the substrate comprises copper.

7. The process of claim 1 wherein the solvent comprises a polar organic solvent.

8. The process of claim 1 wherein the ratio of nanotubes to polymer in the suspension is such that the composite film is electrically conductive.

9. The process of claim 1 wherein the ratio of nanotubes to polymer in the suspension is such that the composite film adheres to the substrate.

10. The process of claim 1 wherein step (i) comprises combining a suspension of the nanotubes with a colloidal suspension of the polymer.

11. The process of claim 10 comprising the step of preparing the colloidal suspension of the ionised polymer by adding a solution of an acid form of the polymer to a mixture of a neutralising agent and a liquid, said liquid being a poor solvent for the polymer and said neutralising agent being sufficiently basic to at least partially deprotonate the acid form of the polymer to form the ionised polymer.

12. The process of claim 1 wherein the voltage is applied for a sufficient time to form the composite film having a predetermined thickness.

13. The process of claim 1 wherein the ratio of carbon nanotubes to polymer is determined so as to achieve a predetermined electrical conductivity.

* * * * *